Oct. 27, 1953
W. A. VENUS
2,656,567
HEATING AND INJECTION CYLINDER IN INJECTION
MOLDING MACHINE FOR THERMOPLASTIC MATERIALS
Filed Sept. 28, 1949
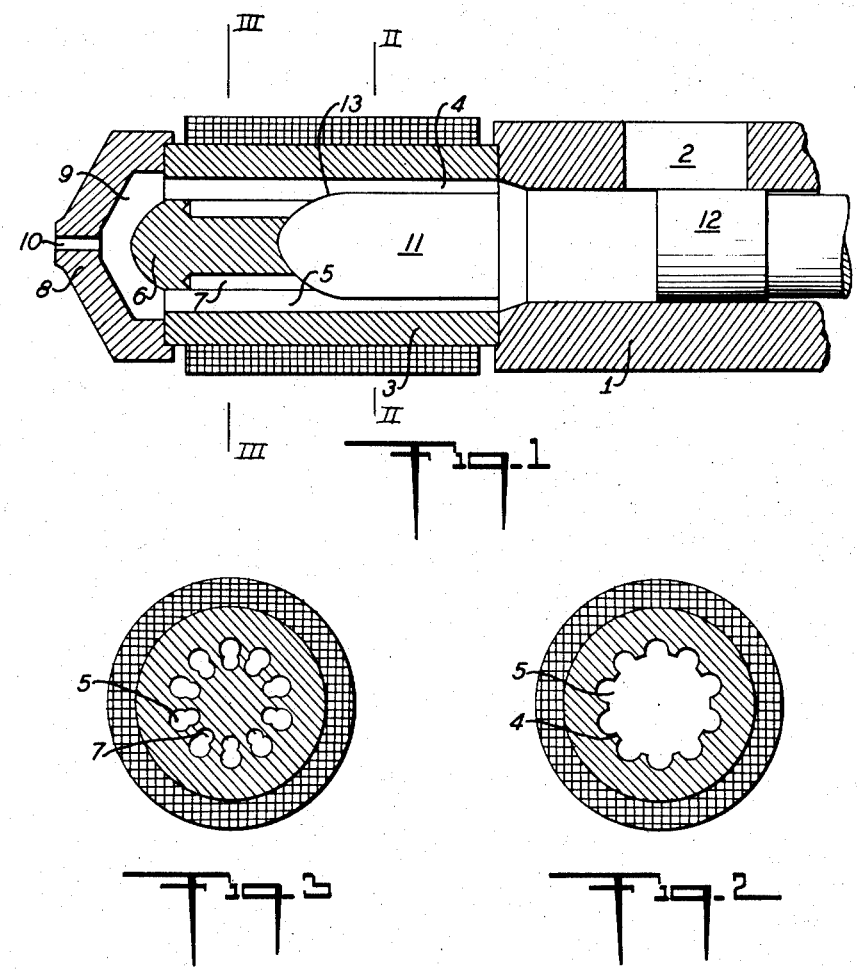
INVENTOR
WILIBALD A. VENUS
BY
ATTORNEYS Patented Oct. 27, 1953

2,656,567

UNITED STATES PATENT OFFICE 2,656,567

HEATING AND INJECTION CYLINDER IN INJECTION MOLDING MACHINES FOR THERMOPLASTIC MATERIALS

Wilibald A. Venus, Munich, Germany, assignor to Hahn & Kolb, Stuttgart-N, Germany Application September 28, 1949, Serial No. 118,287
In Germany October 1, 1948

3 Claims. (Cl. 18—30)

In injection molding machines for the molding of thermoplastic materials heating and injection cylinders are designed in accordance with requirements as they exist in actual practice. Aside from minor factors, every injection cylinder should transmit a maximum of heat and have a minimum resistance to the flow of plastic material. Heat is usually transmitted to the injection cylinder through the outer wall by electric heating coils mounted on the outside of said wall. In order to achieve a proper heat transmission to the center of the plastic material, ribs were provided in the cylinder bore in such a way that around the center a certain cross section remained unrestricted so as to lower the resistance to flow. However, ribs arranged on the inner wall are difficult to manufacture. Moreover, the material in the unrestricted centrally located cross section is but poorly heated with the result that this low-temperature material mixes, on its travel through the cylinder, with other better heated material located between the ribs. When this mixture with its heterogeneous temperatures is injected through the nozzle, the quality of the moldings is not uniform. In order to avoid these drawbacks the cylinder is preferably designed as shown in the drawing:

Fig. 1 shows a longitudinal section through a cylinder constructed according to the invention;

Figs. 2 and 3 show cross sections on the line II—II and III—III of Fig. 1.

The material cylinder into which material is fed through opening 2 is arranged in line with the heating cylinder 3 having a bore 11 provided with rib-like radial fins 4 which are formed by holes 5 arranged in the outer wall of bore 11. Cross section of cylinder 3 on line I—I is shown in Fig. 2.

The cross section of bore 11 of heating cylinder 3 is reduced from point 12 on, the end of the bore being thus of a cone-like shape. The remaining part of cylinder 3 has holes 7 running parallel to holes 5, the two holes intersecting each other along two lines on their cylindrical surfaces. The holes 7 being blind holes do not run the whole length of holes 5. Arranged in front of heating cylinder 3 is a head 8 with a ring-like space 9 into which the holes 5 enter. Provided at the front part of cone-shaped head 8 is the nozzle bore 10 leading to the mold.

The operating principle of the cylinder is as follows:

The granulated or powdered material entering feeding cylinder 1 through opening 2 is first forced into bore 11 of heating cylinder 3 by injection plunger 12. In this cylindrical space the inner walls with their rib-like fins 4 transmit such an amount of heat to the material that the latter is plasticized, the degree of plasticity of the compound being a measure for resistance to forming. The material is then forced, by the pressure of the injection plunger 12, into the cone-shaped space 13 of bore 11 and from there into holes 5 and 7. During its passage through this part of the heating cylinder, the material receives an especially large quantity of heat through the walls of holes 5 and 7. Since the surface of the holes is large compared with their cross sections, the material is quickly heated to injection temperature. The material forced forward in holes 7 is, upon leaving holes 7, first passed on to holes 5 running full length of cylinder 5, where it mixes thoroughly with the material already traveling in hole 5. Finally the various streams of material further mix in ring-shaped space 9 so as to obtain a proper mixture at the nozzle bore 10.

The thermal qualities of the plastic materials determine the dimensions of space 11 and of the cone-shaped space 13 as well as of holes 5 and 7 and their relations to each other. A material slow in plasticizing needing a large amount of heat requires a longer throughhole 11 than a material needing less heat for becoming plastic. By properly dimensioning space 11 it is possible to control the plasticizing of the material before it enters the intersecting holes 5 and 7, with the result that a comparatively small pressure suffices for forcing the material through these holes. The cylinder 3 is one integral piece.

I claim:

1. In injection molding machines, an integral heating and injection cylinder adapted for use with thermoplastic materials, in which the heat is transmitted through the cylinder to the material by means arranged on the outside of the cylinder, the heating cylinder comprising a longitudinal inner heating chamber within an integral structure having a circle of outer bore holes and a second circle of inner bore holes, said inner bore holes being arranged parallel to the outer bore holes, each outer bore hole intersecting the inner bore hole within the same radial plane on two parallel lines of their surfaces, the bore holes of the one circle extending the entire length of the outer portion of said cylinder, the bore holes of the other circle ending shortly before the outlet ends of the bore holes of the one circle, and said cylinder having a large central bore hole therein beginning with its cylindrical portion at the inlet end of said integral structure and ending with a tapered portion before the ends of the shorter bore holes, and the diameter of said central bore hole being such as to intersect the inner bore holes as well as the outer bore holes.

2. In injection molding machines, an integral heating and injection cylinder adapted for use with thermoplastic materials, in which the heat is transmitted through the cylinder to the material by means arranged on the outside of the cylinder, the heating cylinder comprising a longitudinal inner heating chamber within an integral structure having a circle of outer bore holes and a second circle of inner bore holes, said bore holes being arranged parallel to the outer bore holes, each outer bore hole intersecting the inner bore hole within the same radial plane on two parallel lines of their surfaces, the bore holes of the one circle extending the entire length of the outer portion of said cylinder, the bore holes of the other circle ending shortly before the outlet ends of the bore holes of the one circle, and said cylinder having a large central bore hole therein beginning with its cylindrical portion at the inlet end of said integral structure and ending with a tapered portion before the ends of the shorter bore holes, and the diameter of said central bore hole being such as to intersect the inner bore holes as well as the outer bore holes, the outer bore holes extending the entire length of the outer portion of said heating cylinder and said inner circle of bore holes ending before the outlet ends of said bore holes of the outer circle and the inner central bore hole ending before the ends of the inner circle of bore holes.

3. In injection molding machines, an integral heating and injection cylinder adapted for use with thermoplastic materials, in which the heat is transmitted through the cylinder to the material by means arranged on the outside of the cylinder, the heating cylinder comprising a longitudinal inner heating chamber within an integral structure having a circle of outer bore holes and a second circle of inner bore holes, said inner bore holes being arranged parallel to the outer bore holes, each outer bore hole intersecting the inner bore hole within the same radial plane on two parallel lines of their surfaces, the bore holes of the one circle extending the entire length of the outer portion of said cylinder, the bore holes of the other circle ending shortly before the outlet ends of the bore holes of the one circle, and said cylinder having a large central bore hole therein beginning with its cylindrical portion at the inlet end of said integral structure and ending with a tapered portion before the ends of the shorter bore holes, the diameter of said central bore hole being such as to intersect the inner bore holes as well as the outer bore holes, and a separate member on the end of the cylinder to form a separate chamber before the outlet nozzle.

WILIBALD A. VENUS.

References Cited in the file of this patent

UNITED STATES PATENTS

| Number | Name | Date |
|---|---|---|
| 2,057,945 | Gastrow | Oct. 20, 1936 |
| 2,226,447 | Smith et al. | Dec. 24, 1940 |
| 2,308,636 | Wheeler | Jan. 19, 1943 |
| 2,480,838 | Caron | Sept. 6, 1949 |
| 2,482,243 | Burnham | Sept. 20, 1949 |
| 2,566,101 | Vltavsky | Aug. 28, 1951 |